United States Patent [19]

Hampshire et al.

[11] Patent Number: 5,774,297

[45] Date of Patent: Jun. 30, 1998

[54] DYNAMIC COMPENSATION OF SERVO BURST MEASUREMENT OFFSETS IN A DISC DRIVE

[75] Inventors: Randall D. Hampshire; Lealon R. McKenzie, both of Edmond; Philip R. Woods, Oklahoma City; Clyde E. Goodner, III, Midwest City, all of Okla.

[73] Assignee: Seagate Technology, Inc., Scotts Valley, Calif.

[21] Appl. No.: 621,659

[22] Filed: Mar. 26, 1996

[51] Int. Cl.$^6$ .................................................. G11B 5/596
[52] U.S. Cl. ..................................... 360/77.04; 360/77.07
[58] Field of Search ........................... 360/77.04, 77.07, 360/77.08, 77.11, 78.07, 770.02

[56] References Cited

U.S. PATENT DOCUMENTS

| | | |
|---|---|---|
| 4,669,003 | 5/1987 | Bell et al. . |
| 4,799,112 | 1/1989 | Bremmer et al. . |
| 4,878,135 | 10/1989 | Makino et al. ................... 360/77.07 X |
| 4,912,585 | 3/1990 | Belser et al. . |
| 4,969,059 | 11/1990 | Volz et al. ........................ 360/77.04 X |
| 5,136,439 | 8/1992 | Weispfenning et al. . |
| 5,262,907 | 11/1993 | Duffy et al. . |
| 5,424,885 | 6/1995 | McKenzie et al. .............. 360/77.04 X |
| 5,457,587 | 10/1995 | Suzuki ............................. 360/77.04 X |
| 5,523,902 | 6/1996 | Pederson ................................ 360/77.08 |
| 5,592,347 | 1/1997 | Mori et al. ........................... 360/77.04 |
| 5,602,693 | 2/1997 | Brunnett et al. ..................... 360/77.08 |

*Primary Examiner*—Aristotelis M. Psitos
*Assistant Examiner*—Larry T. Cullen
*Attorney, Agent, or Firm*—Bill D. McCarthy; Edward P. Heller, III; Randall K. McCarthy

[57] ABSTRACT

Method and apparatus for dynamically compensating for servo burst measurement offsets in a disc drive. A first type of servo position error signal is used during a compensation routine to position a head adjacent a selected track on a disc, the first type of servo position error signal determined from servo burst signals read by the head from servo position fields on the disc. A second type of servo position error signal is also generated from the servo burst signals and the difference between selected values of the second type of servo position error signal is compared to an acceptance limit. Compensation terms are incrementally added to the servo burst signals used to generate the second type of servo position error signal until the difference is below the acceptance limits. Thereafter, the compensation terms are stored and retrieved during normal track following operations to generate a compensated servo position error signal.

8 Claims, 8 Drawing Sheets

DYNAMIC COMPENSATION OF SERVO BURST MEASUREMENT OFFSETS IN A DISC DRIVE

BACKGROUND OF THE INVENTION

1. Field of the Invention

This invention relates generally to the field of disc drive data storage devices, and more particularly, but not by way of limitation, to an apparatus and method for compensating for measurement offsets in a disc drive servo system.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention and incorporated herein by reference. In such a system, head position (servo) information is prerecorded on at least one surface of the discs. The servo system can be a "dedicated" servo system, in which one entire disc surface is prerecorded with the servo information and a corresponding dedicated servo head is used to provide essentially continuous servo position information to the servo system. Alternatively, an "embedded" servo system can be implemented in which servo information is interleaved with user data and intermittently read by the same heads used to read and write the user data.

With either a dedicated or embedded servo system, it is common to generate a servo position error (SPE) signal which is indicative of the position of the head with respect to the center of a particular track; for reference, this signal is also know as a "position error signal", or "PES". Particularly, during track following, the servo system generates the SPE signal from the received servo information and then uses the SPE signal to generate a correction signal which is provided to a power amplifier to control the amount of current through the actuator coil, in order to adjust the position of the head accordingly.

Typically, the SPE signal is presented as a position dependent signal having a magnitude indicative of the relative distance between the head and the center of a track and a polarity indicative of the direction of the head with respect to the track center. Thus, it is common for the SPE signal to have values ranging from (for example) −0.5 to +0.5 as the head sweeps across the track and to have a value of 0 when the head is centered on the track. It will be recognized that the SPE signal is generated by the servo system by comparing the relative signal strengths of precisely located magnetized sections (dibits) in the servo information on the disc surface. As discussed more fully in the previously incorporated Duffy et al. U.S. Pat. No. 5,262,907, the dibits are generally arranged in an "offset checkerboard" pattern so that, through manipulation of the magnitudes of the read signals provided to the servo system as the dibits are read, the relative position of the head to a particular track center can be determined (and subsequently controlled). Of course, in digital servo systems the SPE signal is generated as a sequence of digital values.

The continuing trend in the disc drive industry is to develop products with ever increasing areal densities (greater than 1 $Gbit/in^2$) and decreasing access times (less than 10 ms). As this trend continues, greater demands are being placed on the ability of modern servo systems to control the position of data head with respect to data tracks. One problem that results with such increased demand in servo positional accuracy relates to the effects of electrical offsets that exist in the servo circuitry. That is, as track spacings continue to decrease so that tracks are brought closer and closer together, the corresponding geometries of (and signal strengths from) the dibits in the servo information decrease as well. This allows the effects of tolerances within the electrical circuitry that reads and provides the read signals from these dibits to become more significant and introduce greater amounts of error and instability into the servo loop. Additionally, media-induced offsets can arise due to imperfections in the uniformity of media magnetization characteristics and these offsets, while heretofore have been negligible, are becoming increasingly significant as areal densities continue to increase.

Measurement errors due to these electrical and media-induced offsets can lead to localized discontinuities in the SPE signal, especially at critical dibit transition points (such as positions at ¼ track away from the center of the track). Such discontinuities can cause the servo system to make unnecessary and incorrect corrections to the head position, introducing instability into the loop.

Prior art attempts have been made to compensate for these offsets by statically "zeroing out" the SPE signal during a disc drive calibration routine. That is, in one such routine the disc drive is operated in a calibration mode during which the servo information read from the disc is switched out of the system, but the SPE signal is still calculated. Ideally, with no servo information input into the servo system the calculated SPE signal should have a nominally zero value. Thus, the magnitude of non-zero SPE signals are attributed to representing the effects of these measurement offsets and during subsequent disc drive servo operation the calculated SPE is compensated accordingly. For additional efforts to compensate for such offsets, see Belser et al. U.S. Pat. No. 4,912,585 entitled DISCRETE TRACK THIN FILM MAGNETIC RECORDING DISK WITH EMBEDDED SERVO INFORMATION, issued Mar. 27, 1990 (disclosing discrete thin film servo recording media). Bell et al., U.S. Pat. No. 4,669,003 entitled METHOD AND APPARATUS FOR ELIMINATING APPARENT OFFSET IN THE SERVO CODE IN A MAGNETIC DISK DRIVE, issued May 26, 1987 (disclosing multiple phases of servo code).

A problem with these and other prior art attempts is the inability to correlate the measurement offset obtained with no servo information input into the servo loop with the dynamic effects that these offsets provide during normal operation of the drive. That is, during operation these offsets cause discontinuities in the calculated SPE signal as well as make the SPE signal non-linear in particular regions of a track. Such effects are due to and depend upon the manner in which the SPE signal is calculated, making conventional "zeroing out" methodologies of the prior art less effective as areal densities increase.

There is a need, therefore, for an improved approach to dynamically compensating for the effects of electrical and media-induced offsets in the measurement of servo information and control of a disc drive actuator.

SUMMARY OF THE INVENTION

The present invention comprises a method and apparatus for dynamically compensating for servo burst measurement offsets in a disc drive. A first type of servo position error signal is used during a compensation routine to position a head adjacent a selected track on a disc, the first type of servo position error signal determined from servo burst signals read by the head from servo position fields on the disc. A second type of servo position error signal is also generated from the servo burst signals and the difference between selected values of the second type of servo position error signal is compared to an acceptance limit. Compensation terms are incrementally added to the servo burst signals used to generate the second type of servo position error signal until the difference is below the acceptance limits. Thereafter, the compensation terms are stored and retrieved during normal track following operations to generate a compensated servo position error signal.

In the preferred embodiment, the first type of servo position error signal is a quadrature servo position error signal and the second type of servo position error signal, as well as the compensated servo position error signal, are normal-plus-quadrature servo position error signals.

An object of the present invention is to compensate for the effects of measurement offsets in servo position fields from a disc drive.

Another object of the present invention is to use a first type of servo position error signal to provide accurate control of the position of the head to allow accurate compensation of a second type of servo position error signal to be subsequently used during disc drive operation.

Yet another object of the present invention is to reduce instability and increase positional accuracy in the servo loop of a disc drive, allowing further advancements in areal densities and rotational speeds.

Other objects, advantages and features of the present invention will be apparent from the following description when read in conjunction with the drawings and appended claims.

BRIEF DESCRIPTION OF THE DRAWINGS

FIG. 9 provides a generalized flow diagram showing the selection logic used to generate the normal-plus quadrature SPE signal of FIG. 8.

DETAILED DESCRIPTION OF THE PREFERRED EMBODIMENT

Figure 1:
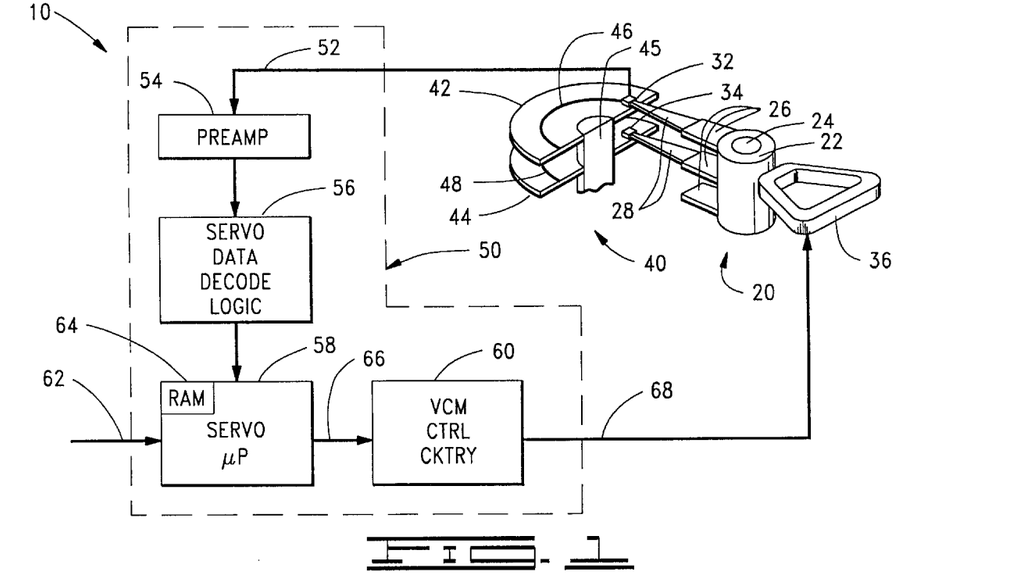
FIG. 1 is a functional block representation of a servo system for a disc drive of the present invention.

Turning now to the drawings and more particularly to FIG. 1, shown therein is a functional block representation of a servo system for a disc drive (generally denoted as 10) of the present invention. More particularly, FIG. 1 shows the disc drive 10 to include an actuator assembly 20, a disc stack 40 and a servo loop 50, with the servo loop 50 operably controlling radial position of the actuator assembly 20 with respect to the disc stack 40.

The actuator assembly 20 comprises an actuator body 22 that pivots about a pivot shaft 24. The actuator body 22 includes arms 26 that extend radially as shown from the actuator body 22, and flexures 28 extend from each of the arms 26. Mounted at the distal end of each of the flexures 28 is a head (two shown in FIG. 1 at 32 and 34, respectively). Additionally, an actuator coil 36 is mounted to the actuator body 22 opposite the arms 26. The coil 36 is part of a conventional voice coil motor (VCM) comprising the coil 36 as well as a pair of permanent magnets (not shown) located above and below the coil 36, so that the coil 36 moves through the magnetic field established by these magnets as the actuator body 22 pivots about the pivot shaft 24.

The disc stack 40 comprises a plurality of discs (two shown in FIG. 1 as 42 and 44, respectively) mounted to a shaft 45 for rotation at a constant high speed by a conventional spindle motor (not shown). The surfaces of the discs 42 and 44 comprise a plurality of radially concentric tracks (two shown at 46 and 48, respectively).

It will be recognized that in a typical disc drive there will be one head per disc surface, but for purposes of clarity only two heads 32 and 34 have been shown in FIG. 1 corresponding to the top surfaces of the discs 42 and 44. It will further be recognized that servo information will be prerecorded on at least one of the surfaces of the discs 42, 44 to provide the requisite servo positioning information to the servo loop 50. As provided hereinabove, in a dedicated servo system one surface of one disc is designated as a dedicated servo surface (such as the top surface of the disc 42) so that servo information is prerecorded on all of the tracks (including track 46) and user data is stored on the remaining disc surfaces) such as on track 48 of the disc 44). In such a case the head 32 would be a servo head and the head 34 would be a data head. Alternatively, in an embedded servo system, the servo information is intermittently prerecorded on all of the tracks, so that each of the tracks 46 and 48 would contain both servo information and user data and the heads 32 and 34 would operate as both a servo and a data head. The present invention is not dependent upon the type of servo system implemented; however, for purposes of clarity it is contemplated that at least track 46 includes servo information that is read by the head 32 and provided to the servo loop 50.

The servo loop 50 receives the servo information from the head 32 on signal path 52 and this servo information is amplified by a preamp circuit 54 and provided to servo data decode logic circuitry 56. The servo data decode logic circuitry 56 includes an analog to digital converter (ADC) so that selected digital representations of the servo information are provided to a servo microprocessor 58. The servo microprocessor 58 generates the aforementioned SPE signal from the servo information and uses the SPE signal to generate and output a correction signal to VCM control circuitry 60. The servo microprocessor 58 determines the correction signal in accordance with commands received by a disc drive system microprocessor (not shown) by way of signal path 62 and programming steps stored in servo RAM 64. The correction signal is provided by way of signal path 66 to VCM control circuitry 60, which includes a power amplifier (not shown) that outputs a controlled dc current of a selected magnitude and polarity to the coil 36 by way of signal path 68 in response to the correction signal. Thus, during track following mode, the servo information indicates the relative position error of the head 32 with respect to the center of the track 46 and the correction signal causes a correction in the dc current applied to the coil 36 in order to compensate for this position error and move the head 32 to the center of the track 46. A detailed discussion of the construction and operation of the servo loop 50 can be found in the previously incorporated Duffy et al. reference, U.S. Pat. No. 5,262,907 as well as U.S. Pat. No. 5,136,439 entitled SERVO POSITION DEMODULATION SYSTEM, issued Aug. 4, 1992 to Weispfenning et al., assigned to the assignee of the present invention and incorporated herein by reference.

Figure 2:
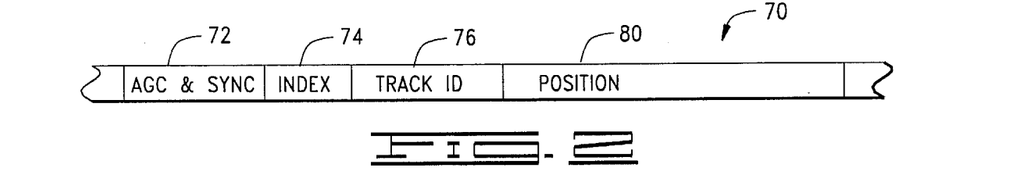
FIG. 2 provides a representation of the general format of a servo frame of the disc drive of FIG. 1.

As will be recognized, the servo information is recorded during the manufacturing of the disc drive 10 using a highly precise servo writer. The servo information serves to define the boundaries of each of the tracks and is divided circumferentially into a number of frames. The general format of one such frame 70 is shown in FIG. 2. More particularly, FIG. 2 shows the frame 70 to comprise a plurality of fields, including an AGC & Sync field 72, an index field 74, a track ID field 76 and a position field 80. Of particular interest is the position field 80, but for purposes of clarity it will be recognized that the AGC and Sync field 72 provides input for the generation of timing signals used by the disc drive 10, the index field 74 indicates radial position of the track and the track ID field 76 provides the track address. Of course, additional fields may be used as desired and the format of the fields in a servo frame will depend upon the construction of a particular disc drive; for more detailed discussion of typical servo fields see the previously incorporated Duffy et al. U.S. Pat. No. 5,262,907 and Weispfenning et al. U.S. Pat. No. 5,136,439 references.

Figure 3:
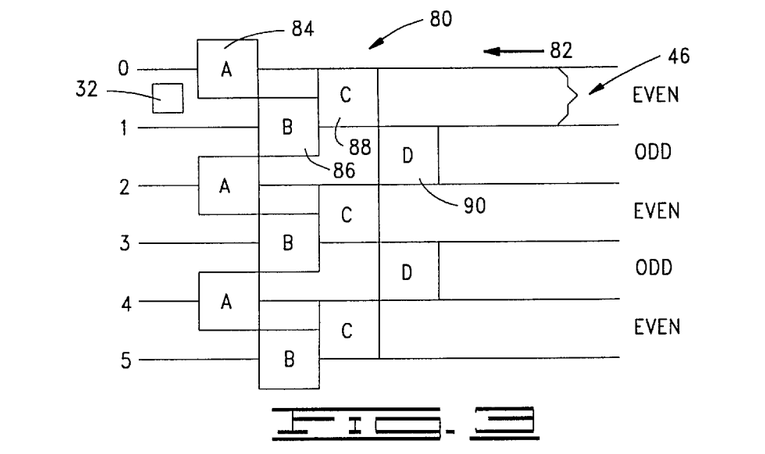
FIG. 3 shows the four position burst fields of the servo frame of FIG. 2.

The position field 80 comprises four position burst fields arranged in an offset, quadrature pattern for a plurality of adjacent tracks, as shown in FIG. 3. More particularly, FIG. 3 shows the position field 80 to comprise burst patterns A, B, C and D having selected geometries and magnetization vectors, defining a plurality of track boundaries identified as 0 to 5. Thus, each track comprises the area bounded by two adjacent track boundaries (e.g., the track 46 of FIG. 1 is represented in FIG. 3 to be bounded by the track boundaries 0 and 1). Additionally, the head 32 of FIG. 1 is represented in FIG. 3 as being centered on the track 46. The direction of rotation of the disc stack 40 (and hence the position field 80) relative to the head 32 is shown by arrow 82.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 32 passes over the position field 80 on track 46, the head will pass over portions of the A and B burst patterns (identified as 84 and 86, respectively) and then over C burst pattern 88. However, the head 32 will not encounter D burst pattern 90, as this pattern is on an adjacent track. For reference, tracks having C burst patterns are referred to as "even tracks" and tracks with D burst patterns are referred to as "odd tracks".

Generally, it will be recognized that when the head 32 is "centered" on the mid-point of track 46, the amplitude of an A burst signal induced in the head 32 by the A burst pattern 84 will be equal to the amplitude of a B burst signal induced in the head by the B burst pattern 86. Moreover, the amplitude of a C burst signal induced by the C burst pattern 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values, as illustrated by FIG. 4.

Figure 4:
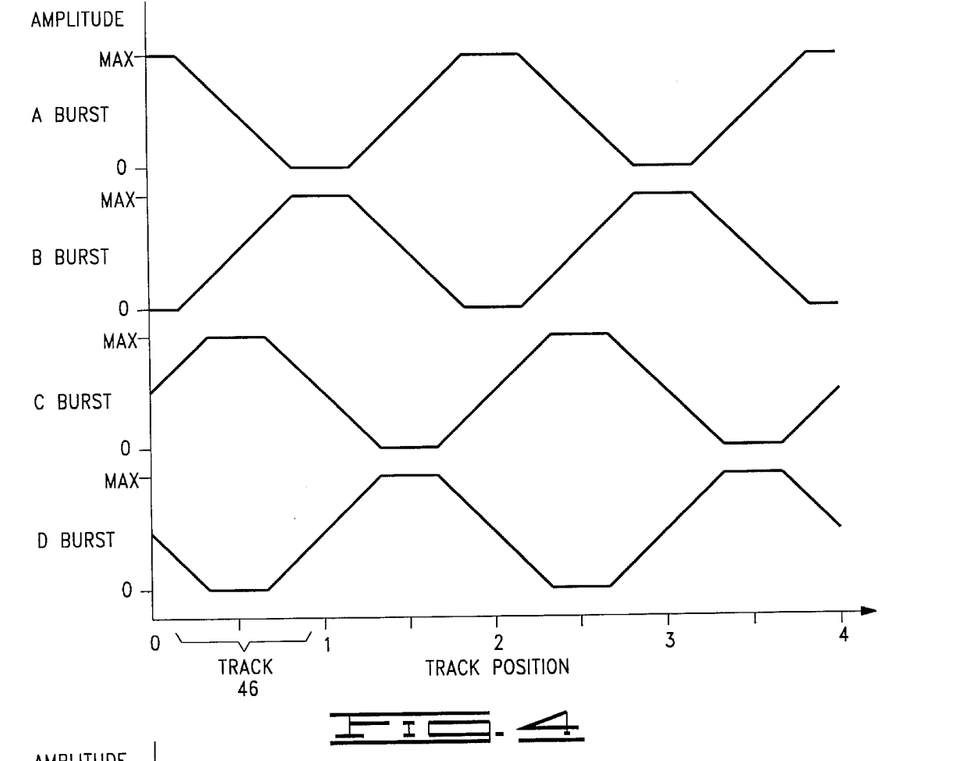
FIG. 4 provides a graphical representation of the amplitudes of the A, B, C and D burst signals from the four position burst fields of FIG. 3.

FIG. 4 provides a graphical representation of the amplitudes of the A, B, C and D burst signals as the head 32 is moved from track boundary 0 to track boundary 4 in FIG. 3. More particularly, FIG. 4 plots each of the burst signals along a common horizontal axis indicative of radial track position and an aligned vertical axis indicative of the amplitude for each of the burst signals from a value of zero to a maximum value. As in FIG. 3, the track 46 is shown in FIG. 4 to comprise the interval between the values of 0 and 1 on the horizontal axis. It will be recognized that both the A and B burst signals and the C and D burst signals can be viewed as being 180 degrees out of phase, respectively and that the A and B burst signals are offset by 90 degrees from the C and D burst signals, respectively.

As explained more fully hereinbelow, the servo system of FIG. 1 relies on the amplitudes of the A, B, C and D burst signals shown in FIG. 4 to generate the SPE signal, which as provided hereinabove is used to generate the correction signal for controlling the position of the head 32. More particularly, in the practice of the present invention the servo system of FIG. 1 first generates a Quadrature SPE signal wherein digital representations of the amplitudes shown in FIG. 4 are provided to the servo microprocessor 58, which determines the following phase values:

$$AmB_n = \frac{(A_n - B_n)(scale)}{(A_n + B_n)(2)} \qquad (1)$$

$$BmA_n = \frac{(B_n - A_n)(scale)}{(A_n + B_n)(2)} \qquad (2)$$

$$CmD_n = \frac{(C_n - D_n)(scale)}{(C_n + D_n)(2)} \qquad (3)$$

$$DmC_n = \frac{(D_n - C_n)(scale)}{(C_n + D_n)(2)} \qquad (4)$$

where $A_n$, $B_n$, $C_n$ and $D_n$ are the digital representations of the amplitudes of the A, B, C and D burst signals respectively, for each sample n; and (scale) represents a head to track geometric scaling factor determined by:

$$scale = (head\ width/track\ width). \qquad (5)$$

The Quadrature SPE (QSPE) signal comprises a composite of selected portions of the four QSPE phase values defined by equations (1)–(4); that is, depending upon the relative position of the head with respect to the track and the track type (even or odd), one of the four QSPE phase values will be selected as the value of the QSPE signal (that is explained more fully hereinbelow). Initially, however, the general shape of the composite QSPE signal is shown in FIG. 5.

Figure 5:
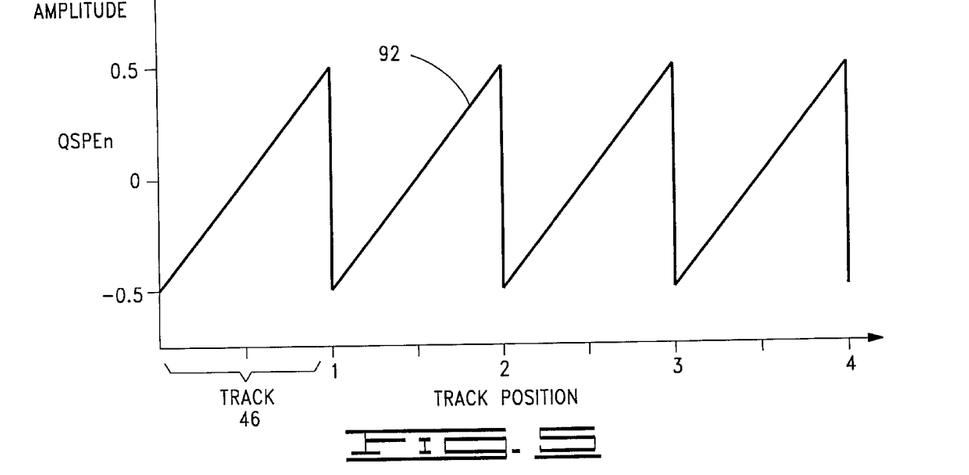
FIG. 5 shows a nominal quadrature SPE signal curve generated from the A, B, C and D burst signals of FIG. 4.

Referring to FIG. 5, shown therein is a nominal QSPE signal curve 92 having an amplitude that ranges essentially in a linear fashion from a minimum value of −0.5 to a maximum value of +0.5 as the head is positioned across one track boundary to the next. That is the QSPE signal has a nominal value of zero when the head is positioned at the center of a track and the QSPE signal increases and decreases, respectively, in a linear fashion as the head is positioned toward the track boundaries. In this way, the amplitude and polarity of the QSPE signal indicate the relative distance and direction of the position of the head with respect to the track center and can thus be used to generate the appropriate correction signal to move the head to the center of the track. It will be readily understood that during operation in the servo loop 50 of FIG. 1, the QSPE signal ranges from minimum to maximum digital values and these digital values correspond to the values shown on the vertical axis of FIG. 5.

Figure 6:
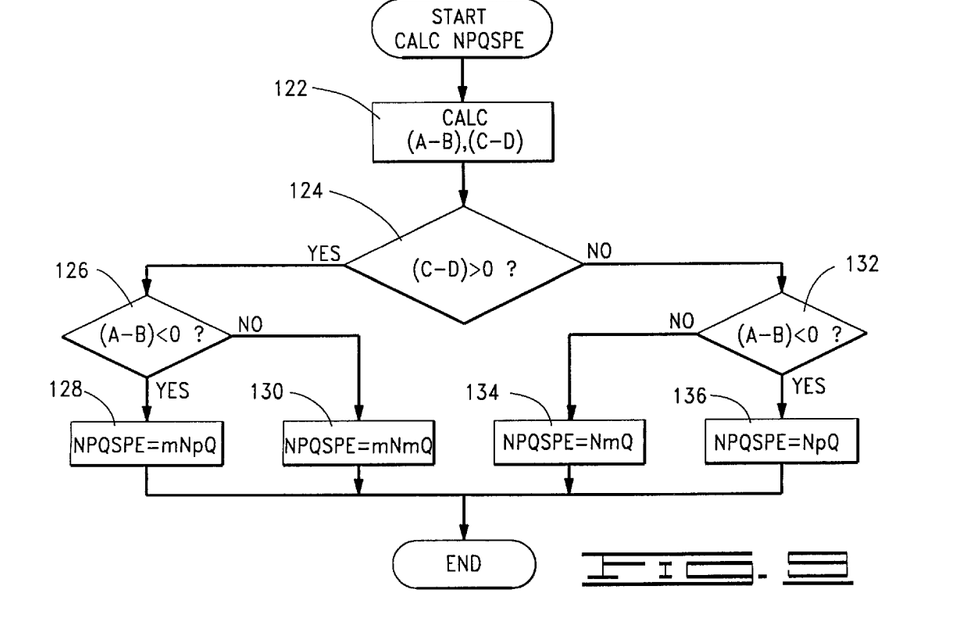
FIG. 6 provides a general flow diagram showing the selection logic used to generate the quadrature SPE signal of FIG. 5.

In order to generate the QSPE signal curve 92 of FIG. 5 from the QSPE phase values AmB, BmA, CmD and DmC, it is necessary to determine whether the track is even or odd and to determine the relative distance of the head from the track center. FIG. 6 provides a general flow diagram showing the corresponding selection logic used to generate the QSPE signal. For purposes of clarity, this flow diagram represents programming steps stored in the RAM 64 and executed by the servo microprocessor 58 of FIG. 1 during servo system operation.

Referring to FIG. 6 and with reference back to FIG. 3, the first step is to determine whether the head 32 is closer to the center of a track or closer to a track boundary. This can be found by an evaluation of the relative amplitudes of the A, B, C and D burst signals (as illustrated in FIG. 3) read by the head 32. More particularly, the flow of FIG. 6 begins at block 102 wherein the quantities |A-B| and |C-D| are calculated. It will be recognized that |A-B| will be less than |C-D| when the head 32 is closer to the center of a track than to a track boundary. Decision block 104 thus compares the quantities |A-B| and |C-D|, and when |A-B| is less than |C-D| the flow continues to decision block 106, wherein the polarity of the CmD phase value is evaluated (as CmD will be negative on an odd track and positive on an even track). Thus, for an odd track the QSPE signal value will be the BmA phase value (as indicated by block 108) and for an even track the QSPE signal value will be the AmB phase value (as indicated by block 110).

However, when the head 32 is closer to a track boundary than to the center of a track, the decision block 104 will pass the flow to decision block 112, wherein the polarity of AmB is evaluated. As shown, if AmB is positive the QSPE value will be CmD plus an offset of ½ (block 114) and if AmB is negative the QSPE value will be DmC plus an offset of ½ (block 116). It will be recognized that the offset values of blocks 114 and 116 are necessary to account for the location of the null point between C and D patterns (such as 88 and 90 of FIG. 3) being ½ track away from track center.

Thus, it will be recognized that during servo operation using the QSPE signal, the head 32 will encounter the frame 70 of FIG. 2 on track 46 and provide signals indicative of the amplitudes of the A, B, C and D burst signals to the servo loop 50. The QSPE phase values will be calculated in accordance with equations (1)–(4) and the QSPE signal will be generated from the QSPE phase values in accordance with the flow of FIG. 6. The value of the QSPE signal will then be evaluated and a correction signal will be output to the VCM control circuitry 60 in order to modify the current passed through the actuator coil 36 and position the head 32 over the center of the track 46.

As provided hereinabove, however, in addition to generating and using the QSPE signal to control the position of the head 32, a second type of SPE signal is also generated from the servo information during operation of the servo system. This second SPE signal is referred to as a Normal-Plus-Quadrature SPE (NPQSPE) signal and is generated in a manner similar to that used to generate the QSPE, including the use of amplitudes of the A, B, C and D burst signals (as shown in FIG. 4). More particularly, generation of the NPQSPE signal involves the determination of the following NPQ phase values:

$$NpQ_n = \frac{(A_n - B_n) + (C_n - D_n)}{[(A_n + B_n + C_n + D_n)](2)} - 1/4 \qquad (6)$$

$$mNpQ_n = \frac{[(A_n - B_n) + (C_n - D_n)](-1)}{[(A_n + B_n + C_n + D_n)](2)} - 1/4 \qquad (7)$$

$$NmQ_n = \frac{(A_n - B_n) - (C_n - D_n)}{[(A_n + B_n + C_n + D_n)](2)} + 1/4 \qquad (8)$$

Figure 7:
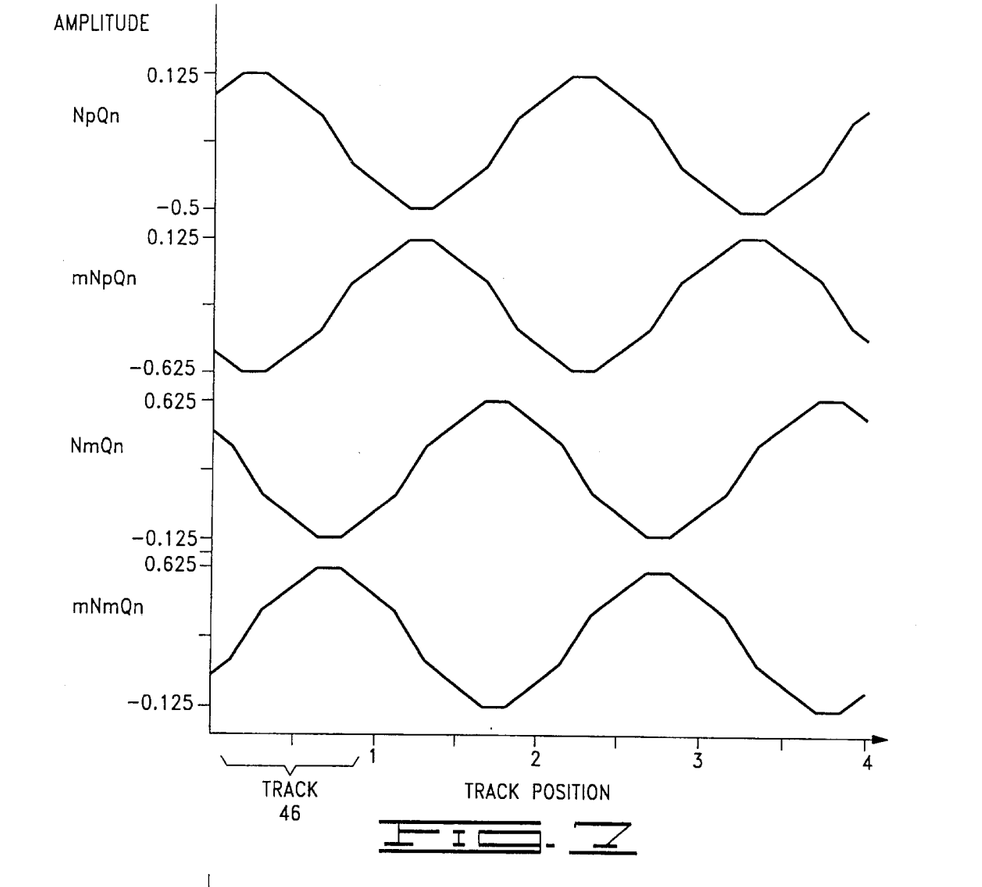
FIG. 7 provides a graphical representation of normal-quadrature phase values calculated from the A, B, C and D burst signals of FIG. 3.

-continued $$mNmQ_n = \frac{[(A_n - B_n) - (C_n - D_n)](-1)}{[(A_n + B_n + C_n + D_n)](2)} + 1/4 \qquad (9)$$

where $A_n$, $B_n$, $C_n$ and $D_n$ are the digital representation of the amplitudes of the A, B, C and D burst signals respectively, for each sample n. For reference, the foregoing NPQ phase values are described as Normal-Plus-Quadrature (NpQ), Minus-Normal-Plus Quadrature (mNpQ), Normal-Minus-Quadrature (NmQ) and Minus-Normal-Minus Quadrature (mNmQ). Graphical representations of these phase values are shown in FIG. 7.

Referring to FIG. 7, the NPQ phase values are shown to cycle from minimum to maximum values with respect to head position in a curvilinear fashion. More particularly, the NpQ and mNpQ values range from –0.5 to 0.125 and the NmQ and mNmQ values range from –0.125 to +0.625 (it will be recognized that the NpQ and mNpQ values as well as the NmQ and mNmQ values are out of phase by 180 degrees, respectively). For reference, when the head 32 is positioned at the center of the track 46, the nominal NPQ phase values are NpQ=0, mNpQ=–0.5, NmQ=0 and mNmQ=+0.5.

Figure 8:
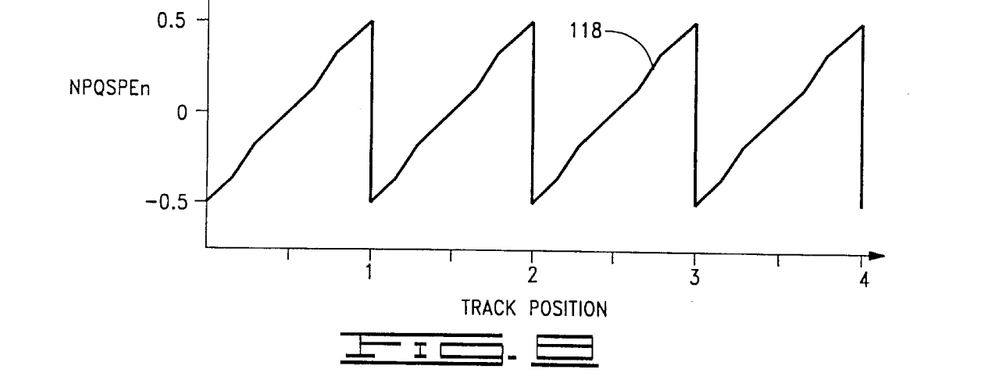
FIG. 8 shows a graphical representation of a nominal normal-plus-quadrature SPE signal generated from the phase values shown in FIG. 7.

As with the QSPE signal, the NPQSPE signal is a composite of selected portions of the NPQ phase values and takes on the general shape as shown in FIG. 8. More particularly, FIG. 8 shows a nominal NPQSPE signal curve 118 having an amplitude that ranges in a curvilinear fashion from –0.5 to +0.5 as the head is swept from one track boundary to the next.

To generate the NPQSPE signal curve 118 of FIG. 8, FIG. 9 has been provided which shows a generalized flow diagram representing programming stored in the RAM 64 and executed by the servo microprocessor 58 of FIG. 1 during servo system operation. Referring to FIG. 9, the flow begins at block 122 wherein the quantities (A-B) and (C-D) are calculated from the A, B, C and D burst signals (of (FIG. 4). The flow continues to decision block 124, wherein the plurality of the quantity (C-D) is evaluated. As provided hereinabove, (C-D) will be positive for even tracks and negative for odd tracks; thus, when the track is even, the flow continues to decision block 126, wherein the polarity of the quantity (A-B) is evaluated. When (A-B) is negative the NPQSPE value is chosen to be mNpQ (as indicated by block 128) and when (A-B) is positive the NPQSPE value is chosen to be mNmQ (block 130). Likewise, when the quantity (C-D) is negative (decision block 124), the flow continues to block 132 where (A-B) is evaluated and NPQSPE is set equal to NmQ (block 134) when (A-B) is positive and NPQSPE is set equal to NPQ (block 136) when (A-B) is negative.

Thus, the servo loop 50 generates an NPQSPE signal from the amplitudes of the A, B, C and D burst signals in accordance with equations (6)–(9) above and the flow of FIG. 9. It will be recognized that the NPQSPE signal can be used as an alternative to the QSPE signal to generate the appropriate control signals to position the head 32 with respect to the track 46. The preferred embodiment of the present invention, however, provides for the generation and use of both QSPE and NPQSPE signals during operation of the servo system. The purpose of generating both QSPE and NPQSPE signals will become apparent hereinbelow.

As provided hereinabove, both electrical and media-induced offsets contribute to measurement errors in the determination of the amplitudes of the A, B, C and D burst signals of FIG. 4. More particularly, FIG. 4 shows these signals having amplitudes ranging from zero to a maximum value (which will be some selected digital value depending upon the ADC scaling employed). However, the ranges shown in FIG. 4 are nominal values; that is, these do not take into account the effects of these electrical and media-induced offsets, which for the disc drive 10 result in the burst signals having nonzero minimum values, different maximum values and, potentially, non-linearities therebetween.

Figure 10:
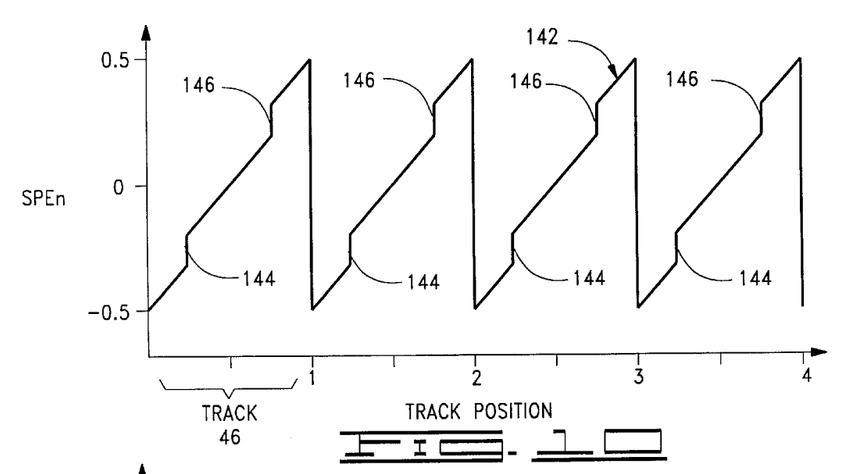
FIG. 10 shows a graphical representation of a quadrature of SPE signal curve taking into account the effects of the electrical and media-induced offsets which are contemplated to exist in the disc drive of FIG. 1.

The effects from these offsets are illustrated in FIG. 10, which shows a graphical representation of a QSPE signal curve 142 generated by the disc drive 10, taking into account the effects of the aforementioned electrical and media-induced offsets which are contemplated to exist in the disc drive. More particularly, FIG. 10 shows the QSPE signal curve 142 to have discontinuities 144 and 146 at locations corresponding to ¼ of the track width (that is, halfway between track centers and track boundaries). It will be understood that these discontinuities 144, 146 arise from the offsets and from the manner in which the QSPE signal is generated; that is, for burst signals having nonzero minimums, equations (1)–(4) and the selection logic of FIG. 6 will result in the QSPE signal curve 142 of FIG. 10. Although the QSPE signal curve 142 is shown to be generally linear at regions close to the center of the track (as with the nominal QSPE signal curve 92 of FIG. 5), the result of the offsets (and the corresponding discontinuities 144 and 146 in FIG. 10) is that as the head moves towards a position halfway between a track center and a track boundary, the "sudden jumps" in SPE values at the discontinuities 144, 146 will cause the servo loop 50 to perceive a large movement by the head 32 when, in fact, the actual movement of the head 32 was relatively small. Thus, the discontinuities 144, 146 in the QSPE signal curve 142 will cause overcorrection and instability in the operation of the servo loop 50.

Figure 11:
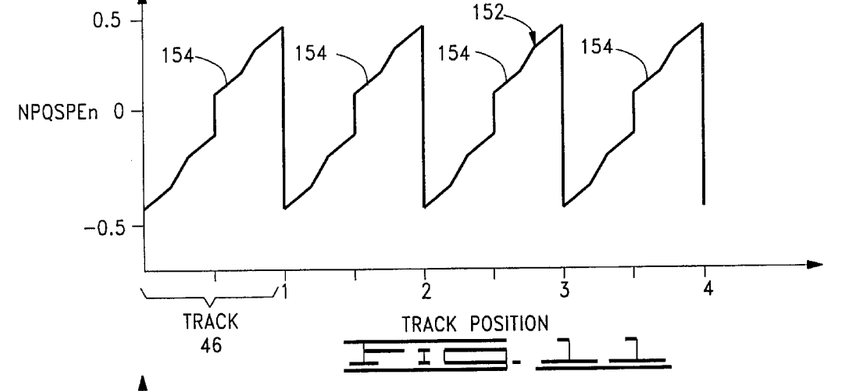
FIG. 11 shows a graphical representation of a normal-plus-quadrature SPE signal curve taking into account the effects of the electrical and media-induced offsets which are contemplated to exist in the disc drive of FIG. 1.

Correspondingly, FIG. 11 shows a graphical representation of an NPQSPE signal curve 152 generated by the servo loop 50 with the same electrical and media-induced offsets as were previously discussed with reference to FIG. 10. More particularly, the NPQSPE signal curve 152 is shown to have discontinuities 154 as a result of the offsets (and located as a result of the manner in which the NPQSPE signal is generated; see equations (6)–(9) and the selection logic of FIG. 9). Additionally, whereas the amplitude of the nominal NPQSPE signal curve 118 (of FIG. 8) extends from –0.5 to +0.5, the range in amplitude of the NPQSPE signal curve 152 of FIG. 11 has been reduced as a result of the offsets.

Figure 12:
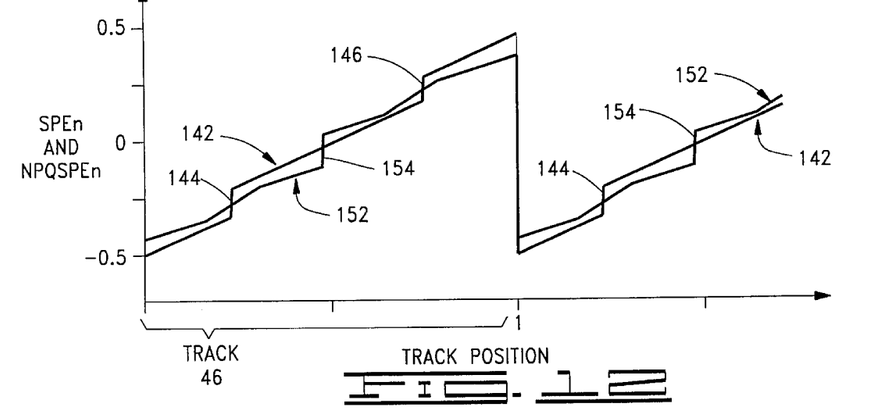
FIG. 12 provides an overlay of the curves of FIGS. 10 and 11.

Although such discontinuities in the QSPE and NPQSPE signals have in the past made precise servo operation difficult, the manner in which the present invention compensates for these discontinuities can now be understood with reference to FIG. 12, which provides an overlay of the QSPE signal curve 142 of FIG. 10 with the NPQSPE signal curve 152 of FIG. 11. As shown in FIG. 12, although both the QSPE signal curve 142 and the NPQSPE signal curve 152 possess localized discontinuities 144, 146 and 154, respectively, these discontinuities do not occur in the same regions of the tracks. That is, the QSPE discontinuities 144, 146 occur near ¼ track locations, whereas the NPQSPE discontinuities 154 occur near track centers.

Thus, the present invention contemplates that one type of SPE signal will be used to position the head in over a selected portion of the track while adjustments are made to a second type of SPE signal in order to remove the effects of the offsets in the second type of SPE signal. Once so compensated, the second type of SPE signal will thereafter be used for servo positioning. More particularly, in the preferred embodiment, during a compensation routine the servo loop 50 will operate to position the head 32 about the center of a selected track using QSPE signal. Because the QSPE signal is linear in this region, the head position can be precisely controlled and maintained about the center of the track. As the head is positioned accordingly, the NPQSPE signal will be calculated, but not used to modify the position of the head 32; rather, adjustments will be made to the NPQSPE signal in order to reduce the discontinuity 154 at the center of the track to an acceptable level through the addition of compensation terms to the values used to calculate the NPQSPE signal. At such time that the NPQSPE signal is adequately compensated, the compensation terms are stored and thereafter used in the generation of a compensated NPQSPE signal, which is subsequently used to control the position of the head 32 during normal disc drive operations.

Figure 13:
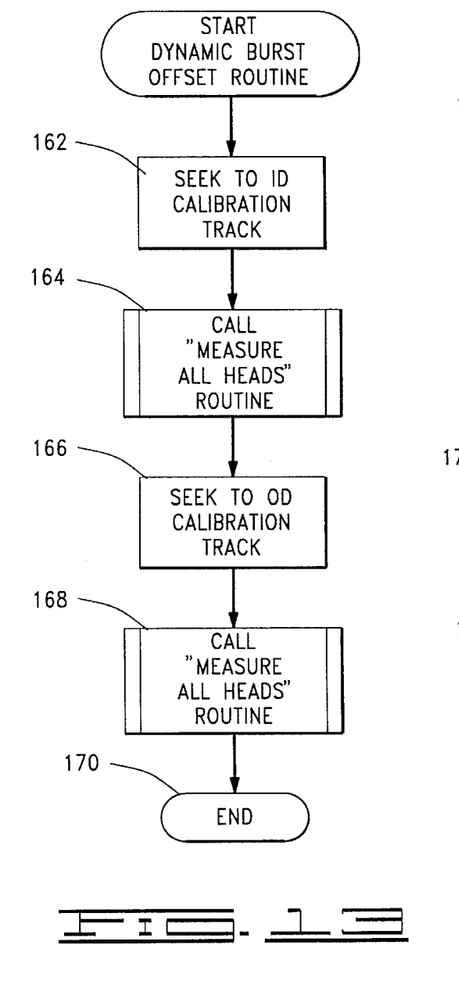
FIG. 13 provides a generalized flow diagram of a DYNAMIC BURST OFFSET routine.

Turning now to FIG. 13, shown therein is a general flow chart illustrating steps performed by the servo microprocessor 58 in accordance with the preferred embodiment of the present invention. More particularly, FIG. 13 illustrates the top level flow diagram for a DYNAMIC BURST OFFSET COMPENSATION routine, which will be discussed in greater detail hereinbelow.

It will be recognized that during the execution of the routine of FIG. 13, the servo loop 50 will generate and use a QSPE signal in order to control the position of the actuator assembly 20 relative to the disc stack 40, in accordance with the foregoing description. Again, once the routine of FIG. 13 is completed, the servo loop 50 will subsequently use the compensation terms obtained from the routine in order to generate and use a compensated NPQSPE signal for actuator servo positioning. Additionally, as discussed below the routine of FIG. 13 performs compensation at tracks located near the inner diameter of the discs 42, 44 as well as at tracks located near the outer diameter of the discs. In this way, compensation terms are derived for both inner and outer diameters of the discs. During subsequent operation of the disc drive, the compensation term for a track at a given radius of the disc can thus be obtained from these derived compensation terms using well known interpolation techniques. Of course, it is explicitly contemplated that compensation terms could be derived for just a single track on the disc, or for a plurality of tracks, including one per zone in disc drives employing zone based recording techniques such as described in U.S. Pat. No. 4,799,102 entitled METHOD AND APPARATUS FOR RECORDING DATA, issued Jan. 17, 1989 to Bremmer et al., assigned to the assignee of the present invention and incorporated herein by reference.

Referring again to FIG. 13, the first step in the flow is to perform a seek to a selected calibration track at the inner diameter (ID) of the disc, as indicated by block 162. As provided hereinabove, this seek will take place in accordance with well known seek methodologies which are beyond the scope of the present discussion, but are discussed in detail in the previously incorporated Duffy et al. U.S. Pat. No. 5,262,907 reference. Once the seek to the calibration track at the inner diameter of the disc is completed, however, it will be understood that the operation of the servo loop 50 to cause the head 32 to follow this track will be through the generation and use of the QSPE signal, as provided hereinabove.

Once the seek is completed, a MEASURE ALL HEADS routine is called at block 164 (to be discussed in more detail hereinbelow). Once the MEASURE ALL HEADS routine completes execution and returns, the flow continues to block 166, wherein a seek is performed to a selected calibration track at the outer diameter (OD) of the disc and the MEA-SURE ALL HEADS routine is again called at block 168. Once the MEASURE ALL HEADS routine returns to block 168, the DYNAMIC BURST OFFSET COMPENSATION routine is completed and ends at block 170.

Figure 14:
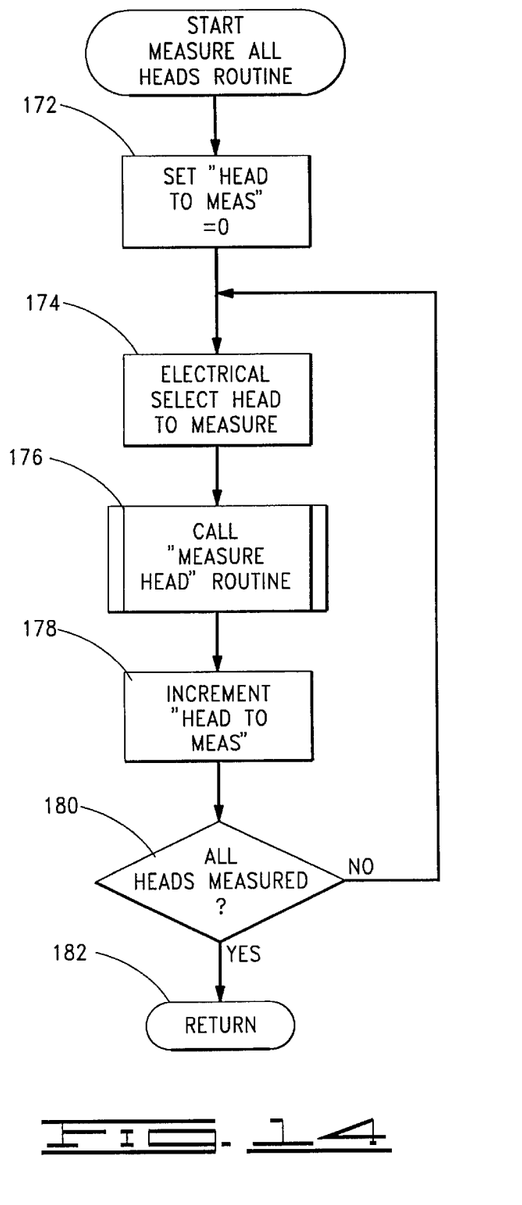
FIG. 14 provides a generalized flow diagram of a MEASURE ALL HEADS routine.

Referring now to FIG. 14, shown therein is a flow chart showing the general steps performed by the MEASURE ALL HEADS routine, previously called in blocks 164 and 168 of the flow of FIG. 13. At such time that the MEASURE ALL HEADS routine is called, the flow is initiated at block 172, wherein the first head to measure is identified (HEAD TO MEAS, which corresponds to a selected memory location in RAM 64, is set to 0). As provided hereinabove, in an embedded servo system, each head operates as both a servo and a data head, in which case each head will be selected in turn by the MEASURE ALL HEADS routine. Alternatively, in a dedicated servo system, only the servo head or heads will be selected. For purposes of FIG. 14 et seq., an embedded servo system is contemplated so that each of the heads in the disc drive 10 (including heads 32, 34) will be selected in turn.

Next, the first head is electrically selected in block 174 and a MEASURE HEAD routine is called in block 176. This routine will be discussed more fully hereinbelow, but after this routine returns, flow continues to block 178, wherein the variable HEAD TO MEAS is incremented and then decision block 180 determines whether all the heads of the drive have been measured. The routine of FIG. 14 will thus continue until all of the selected heads have been measured, and then the flow will return at block 182.

Figure 15:
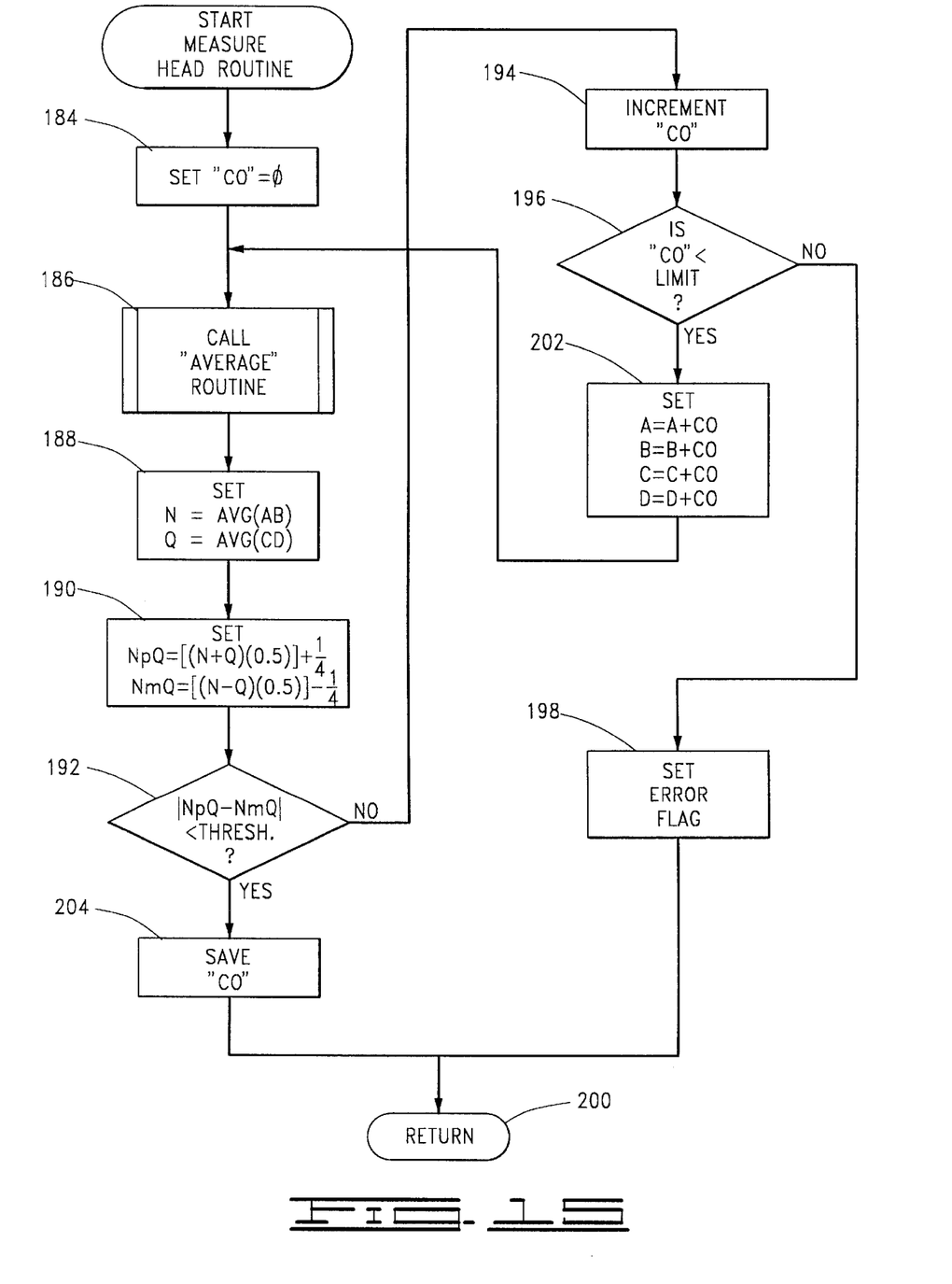
FIG. 15 provides a generalized flow diagram of a MEASURE HEAD routine.

The MEASURE HEAD routine called in block 176 of FIG. 14 is shown in FIG. 15 and begins at block 184, wherein a compensation term "CO" (for "compensation offset") is set to zero. Next, the flow continues at block 186, wherein an AVERAGE routine is called (discussed below). Generally, the AVERAGE routine obtains average values AVG(AB) and AVG(CD), representing the averages of the quantities $((A-B)/(A+B))$ and $((C-D)/(C+D))$. Once these values are obtained, the flow of FIG. 15 continues at block 188, where the variables N and Q are set equal to the returned quantities AVG(AB) and AVG(CD). Thereafter, at block 190 variables NpQ and NmQ are calculated as shown (for reference, the difference between these values is generally indicative of the discontinuity 154 of the NPQSPE signal curve 152 of FIGS. 11 and 12). The absolute value of the difference between NpQ and NmQ is evaluated in decision block 192 relative to a selected threshold value, the threshold value selected in accordance with the maximum acceptable amount of discontinuity in the NPQSPE signal. At such times that the difference between the NpQ and the NmQ values is greater than the threshold value, the flow continues from the decision block 192 to block 194, wherein the compensation offset (CO) term is incremented. The amount that the term CO is incremented will depend upon the desired iteration speed and precision of the operation of the routine of FIG. 15, but for purposes of disclosure in the preferred embodiment this term is incremented by a value of $100_H$. That is, in block 194 the term CO is set equal to $(CO+100_H)$.

The flow continues at decision block 196, wherein the new value of the CO term is evaluated to determine whether CO exceeds a predetermined maximum limit; if so, an error flag (with necessary code information in a conventional manner) is set by block 198 and the routine of FIG. 15 returns at block 200. At such times that CO is less than the predetermined maximum limit, the flow passes from the decision block 196 to bock 202, wherein new values for A, B, C and D are determined by the addition of the CO term to each of these values, as shown. The flow then returns back to block 186, where the AVERAGE routine is again called and calculates new values for the average quantities AVG (AB) and AVG(CD), based on the new values of A, B, C and D determined in block 202.

The flow of FIG. 15 will continue until either an error flag is set by block 198 (the value of the CO term exceeds the predetermined maximum limit) or the value of the difference between NpQ and NmQ (decision block 192) is less than the predetermined threshold (the discontinuity 154 has been reduced to an acceptable level). At such time that the difference between NpQ and NmQ is less than the threshold, the flow continues from decision block 192 to block 204, wherein the CO term is saved for the head being measured. The flow of FIG. 15 then returns at the block 200.

Figure 16:
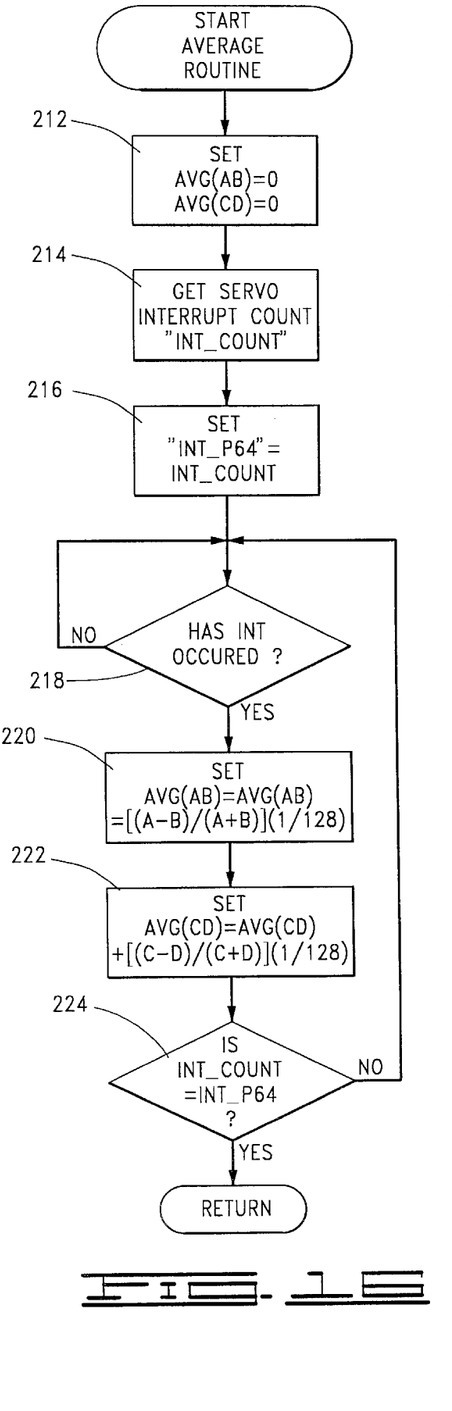
FIG. 16 provides a generalized flow diagram of an AVERAGE routine.

Having now concluded a discussion of the MEASURE HEAD routine of FIG. 15, attention is now directed to FIG. 16, wherein the steps performed in calculating the averages of the quantities ((A−B)/(A+B)) and ((C−D)/(C+D)) during the AVERAGE routine will be discussed. Referring to FIG. 16, the AVERAGE routine begins at block 212, wherein the variables AVG(AB) and AVG(CD) are set equal to zero. Next, these servo interrupt count (INT_COUNT) is determined. It will be recognized that in the servo system of the present invention, an interrupt is generated and provided to the servo microprocessor 58 each time that servo information is being presented in order to instruct the servo microprocessor 58 to perform the necessary servo operations using the presented servo information. The interrupt count corresponds to the number of interrupts that have occurred since the beginning of a disc revolution and the generation and use of such interrupts in disc drive control is well known (see, for example, the Duffy et al. U.S. Pat. No. 5,262,907 reference). As will be explained below, the purpose of identifying the interrupt count INT_COUNT is to identify the starting point for the averaging of the quantities ((A−B) /(A+B)) and ((C−D)/(C+D)), which will take place over a predetermined number of samples.

Once the INT_COUNT is identified, the flow of FIG. 16 continues at block 216 wherein a final interrupt count (INT_P64) is set equal to INT_COUNT+64, as shown. As the averaging takes place over 64 samples, INT_P64 identifies the interrupt count that will be reached at the end of the averaging routine. It will be recognized that 64 samples have been selected in order to provide the averaging, but other quantities could be readily chosen as desired. It will be noted that a sufficient number of samples should preferably be used in order to take the average of the A, B, C and D values over a relatively large portion of a disc rotation.

Once, the INT_P64 value has been determined, the flow of FIG. 16 continues to decision block 218, wherein the flow waits for the next interrupt to occur. At such time that the next interrupt occurs, the flow continues to blocks 220 and 222, wherein the value (AVG(AB) is determined as shown from the values A and B and the value AVG (CD) is determined as shown from the values C and D, respectively. It will be recognized that the A, B, C and D values may be the actual values obtained from the head, or may be adjusted values (in accordance with block 202 of FIG. 15). Additionally, it will be recognized that blocks 220 and 222 include a term of 1/128 and this corresponds to the 64 samples over which the average is taken (effectively providing a multiplication term of 64/128 or ½ once all samples have been added); thus, as provided hereinabove, changes to the number of samples over which the average is taken should include a corresponding change to this term in blocks 220 and 222.

Once the AVG(AB) and AVG(CD) values are determined in blocks 220 and 222, flow continues to decision block 224, wherein the INT_COUNT value is checked against the final interrupt count value INT_P64; that is, if less than the 64 samples have been received and calculated, the flow returns to decision block 218, where the routine waits for the next interrupt and then proceeds to generate new, updated values for AVG(AB) and AVG(CD) in blocks 220 and 222. At such time that the total number of samples (64) have been obtained, the flow exits the decision block 224 and returns at block 226.

Figure 17:
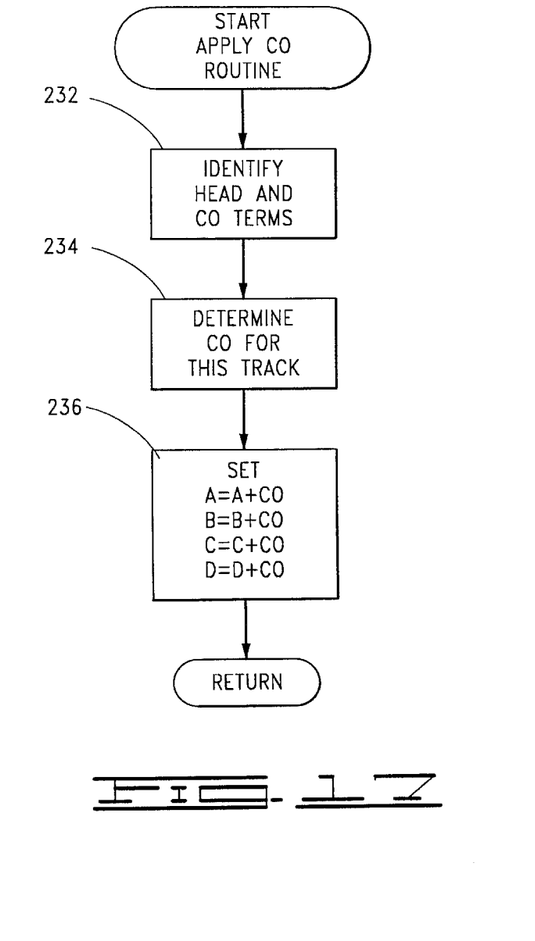
FIG. 17 provides a generalized flow diagram of an APPLY CO routine.

Having now concluded the discussion of the DYNAMIC BURST OFFSET COMPENSATION routine with reference to FIGS. 13–16, reference is now made to FIG. 17, which illustrates a generalized flow of steps performed during subsequent operation of the servo loop 50. More particularly, as provided hereinabove, it is contemplated that the DYNAMIC BURST OFFSET COMPENSATION routine will be performed by the disc drive at selected moments during operation (such as during a disc drive reset) in order to obtain compensation terms CO for each of the applicable heads at desired track locations (which in the preferred embodiment are at the inner diameter and outer diameter calibration tracks). As provided hereinabove, the servo loop 50 will generate and use the QSPE signal in order to position the heads during the DYNAMIC BURST OFFSET COMPENSATION routine, but thereafter will generate and use a compensated NPQSPE signal during normal disc drive servo operations. The compensated NPQSPE will be generated in accordance with the foregoing discussion, with the addition of the adjustment of the "raw" A, B, C and D burst signals in accordance with FIG. 17.

Referring to FIG. 17, an APPLY CO routine is shown which begins at block 232, wherein the particular head providing the servo information is identified, as well as the associated CO terms which were previously determined during the DYNAMIC BURST OFFSET COMPENSATION routine. The flow continues to block 234 wherein the CO term for this track is calculated using well known interpolation techniques with the CO terms at the inner and outer diameters of the track. Once the CO term is calculated, the values of A, B, C and D are determined as shown using this CO term at block 236, after which the flow returns at block 238.

It will be recognized from the foregoing discussion that in the preferred embodiment, the QSPE signal is used to position the head 32 about the center of the ID and OD calibration tracks while the compensation terms (CO) for the NPQSPE signal are determined for these tracks. Thereafter, the disc drive uses the compensation terms to iterate to the appropriate operational compensation terms in generating a compensated NPQSPE signal. It will be recognized that other methodologies can be employed to generated different SPE signals from those disclosed hereinabove. Further, the NPQSPE signal could be used initially to position the head 32 at ¼ track positions in order to compensate for the discontinuities in the QSPE signal at these locations, thereafter facilitating the use of a compensated QSPE signal. Likewise, as the CO terms serve to remove the effects of the measurement offsets in the A, B, C and D burst signals, it will be recognized that both the QSPE and NPQSPE may be used during subsequent disc drive servo operation as desired.

For purposes of the appended claims, the phrase "first type of servo position signal" will be understood in accordance with the foregoing discussion to describe a servo position error signal determined from a first set of combinations of digital representations of servo burst signals, such as for example the QSPE signal having phase values determined in accordance with the set of combinations set forth by equations (1) through (4) and the flow of FIG. 6. Similarly, the phrase "second type of servo position error signal" will be understood in accordance with the foregoing discussion to describe a servo position error signal determined from a second, different set of combinations of digital representations of servo burst signals, such as for example the NPQSPE signal having phase values determined in accordance with the set of combinations set forth by equations (6) through (9) and the flow of FIG. 9.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type including a disc and an actuator adjacent the disc, the actuator having a head and an actuator coil, the disc having a surface including a plurality of nominally concentric tracks and servo position fields read by the head to provide servo burst signals indicative of the relative position of the head with respect to the tracks, the disc drive further including servo loop circuitry for applying current to the actuator coil to position the head with respect to the disc surface, a method for dynamically compensating for measurement offsets in the servo burst signals, the method comprising the steps of:

generating and using a first type of servo position error signal from a first set of combinations of digital representations of servo burst signals read from a selected track to maintain the head at a selected radial position relative to the selected track; and generating a compensated servo position error signal to position the head relative to the tracks on the disc surface during track following operations, comprising the steps of:

generating a second type of servo position error signal from a second set of combinations of digital representations of the servo burst signals read from the selected track as the head is maintained at the selected radial position relative to the selected track using the first type of servo position error signal, the second set of combinations different from the first set of combinations;

incrementally adding compensation terms to the digital representations of the servo burst signals used to generate the second type of servo position error signal until the difference between selected values of the second type of servo position error signal is less than a predetermined acceptance limit;

storing the compensation terms; and using the compensation terms to generate the compensated servo position error signal.

2. The method of claim 1, wherein the compensation terms are determined for tracks located near the inner and the outer diameter of the disc and are used to generate the compensated servo position error signal for remaining tracks using interpolation techniques.

3. The method of claim 1, wherein the step of using the compensation terms to generate the compensated servo position error signal comprises the steps of:

retrieving the compensation terms;

using the retrieved compensation terms to modify the digital representations of the servo burst signals read from the tracks to generate compensated digital representations of the servo burst signals; and generating the compensated servo position error signal using the compensated digital representations of the servo burst signals.

4. A method for compensating for servo information measurement offsets in a servo system of a disc drive, the disc drive including a disc and an actuator adjacent the disc, the disc including servo position fields read by a head of the actuator to provide servo burst signals indicative of the relative position of the head with respect to tracks on the disc, the method comprising:

performing a seek operation to position the head adjacent a selected track;

generating a first type of servo position error signal from a first set of combinations of digital representations of servo burst signals read from the selected track and using the first type of servo position error signal to maintain the head at a selected radial position relative to the selected track;

while maintaining the head at the selected radial position relative to the selected track, generating a second type of servo position error signal from a second set of combinations of the digital representations of the servo burst signals read from the selected track, the second set of combinations different from the first set of combinations;

evaluating the effects of servo information measurement offsets by comparing the difference between selected values of the second type of servo position error signal to a predetermined acceptance limit;

repetitively generating an adjusted second type of servo position error signal from adjusted digital representations of the servo burst signals generated through incremental addition of selected compensation terms to the digital representations of the servo burst signals and comparing the difference between selected values of the adjusted second type of servo position error signal to the predetermined acceptance limit;

saving the compensation terms when the difference between selected values of the adjusted second type of servo position error signals is less than the predetermined acceptance limit; and thereafter, using the compensation terms to generate a compensated servo position error signal for positioning the head during subsequent track following operations.

5. The method of claim 4, wherein the compensation terms are determined for tracks located near the inner and the outer diameter of the disc and interpolation techniques are employed to generated the compensated servo position error signal from these compensation terms for remaining tracks.

6. The method of claim 4, wherein the step of using the compensation terms to generate the compensated servo position error signal comprises the steps of:

retrieving the compensation terms;

using the compensation terms to modify the digital representations of the servo burst signals read from the tracks to generate compensated digital representations of the servo burst signals; and generating the compensated servo position error signal using the compensated digital representations of the servo burst signals.

7. A disc drive, comprising:

a rotatable disc including a plurality of tracks, each track having a plurality of servo position fields;

a controllably positionable head adjacent the disc which reads the servo position fields to provide analog servo burst signals indicative of relative position of the head with respect to the servo position fields;

servo data decode logic, responsive to the head, which generates digital representations of the servo burst signals;

a servo processor, responsive to the servo data decode logic, which:

generates a first type of servo position error signal from a first set of combinations of the digital representations of the servo burst signals to maintain the head at a selected radial position relative to a selected track, while:

generating a second type of servo position error signal from a second set of combinations of the digital representations of the servo burst signals; and adding compensation terms to the digital representations of the servo burst signals used to generate the second type of servo position error signal until a difference between selected values of the second type of servo position error signal is less than a predetermined limit; and thereafter, uses the compensation terms to generate a compensated servo position error signal to control the position of the head.

8. The disc drive of claim 7, wherein the servo processor uses the compensation terms to generate a compensated servo position error signal by adding the compensation terms to the digital representations of the servo burst signals obtained from the servo fields of the tracks.

* * * * *